United States Patent [19]

Trilling et al.

[11] 4,436,759

[45] Mar. 13, 1984

[54] PRODUCTION OF SHAPED FOOD PRODUCTS

[75] Inventors: David M. Trilling, Wellesley, Mass.; Yechiel Smadar, Ramat Hasharon, Israel

[73] Assignee: Caribou Fisheries, Inc., Boston, Mass.

[21] Appl. No.: 362,301

[22] Filed: Mar. 26, 1982

[51] Int. Cl.³ .............................................. A23L 1/04
[52] U.S. Cl. .................................. 426/573; 426/575; 426/574; 426/271; 426/516; 426/289; 426/89
[58] Field of Search ............... 426/573, 575, 291, 289, 426/292, 89, 516, 517, 523, 271

[56] References Cited

U.S. PATENT DOCUMENTS

| | | | |
|---|---|---|---|
| 2,791,508 | 5/1957 | Rivoche | 426/575 |
| 3,114,639 | 12/1963 | Rivoche | 426/573 |
| 3,591,389 | 7/1971 | Schneider | 426/573 |
| 3,650,766 | 3/1972 | Smadar | 426/292 |
| 3,676,158 | 7/1972 | Fischer | 426/575 |
| 4,126,704 | 11/1978 | McCarthy | 426/575 |
| 4,168,325 | 9/1979 | Gonzalez | 426/575 |

*Primary Examiner*—Jeanette M. Hunter
*Attorney, Agent, or Firm*—Hubbell, Cohen, Stiefel & Gross

[57] ABSTRACT

Shaped gelled food products manufactured from comminuted, granulated or chopped foodstuffs, such as vegetables, fruits, meats, fish, and a process therefor.

26 Claims, No Drawings

PRODUCTION OF SHAPED FOOD PRODUCTS

BACKGROUND ART

Production of food products by reconstitution of comminuted materials by shaping the comminuted materials with the aid of gums and gel-forming materials, by mechanical methods such as extruding and molding, as well as by thermal treatment such as heating or cooling, are common practices in the food industry. Various processes are known for the production of such shaped food products. Many of these processes are based on the use of a gel forming system comprising an alginate and a bivalent cation such as the calcium ion.

One type of process employing these materials produces a shaped product encased in a skin, such as a sausage. For example, U.S. Pat. Nos. 3,650,765 and 3,650,766 disclose food products which are manufactured in any shape or size by a process including the steps of forming an extrudable slurry of a food material, extruding the slurry and forming a gel-like skin around the extruded product. The skin is formed by subjecting gelable materials such as alginates to the action of gelation agents such as alkaline earth ions, at the surface of the extrusion product. U.S. Pat. Nos. 3,891,776; 3,922,360; 4,117,172 and 3,676,158 also disclose similar processes whereby a shaped food product encased in a skin is formed. Some of these processes produce a peelable, self-supporting skin. When the skin is peeled off and the resulting product is again subjected to a bivalent cation solution, a skin is again formed.

Other processes based on the use of alginates and calcium ions produce a stabilized food product where the alginate contained in the slurry used for production is converted throughout into a complete advanced gel. For example, U.S. Pat. No. 2,791,508 discloses a process for producing reconstituted food products comprising initially forming a thixotropic semi-gel like substance by dispersing a comminuted, powdered, granulated or shredded foodstuff in a water solution of an edible hydrophilic colloid in which the dispersed foodstuff is present as discreet particles more or less completely enclosed in a matrix of the colloid gel. Alginates are disclosed as useful hydrophilic colloids. In addition, a gelation agent such as calcium carbonate must be added to the dispersed foodstuff and hydrophilic colloid to institute gelation. The time at which the gelation agent is added to the dispersion of foodstuff and hydrophilic colloid is critical since when the gelation agent is added, it liberates calcium ions which rapidly react with the colloid thereby forming a gel. Since this gelation occurs rapidly, it is necessary to quickly transfer the substance to an extruding feed pipe wherein the final advanced gel structure is formed. The feed pipe must be of such a length that the ensuing mixture becomes an advance gel substantially simultaneous with its exit. This is a major disadvantage since if the gelation agent is added too soon, the mixture will become an advanced gel before it exits the extruder thereby creating a blockage in the extruder mechanism. If, on the other hand, the gelation agent is added too late, the mixture will not become an advanced gel when it exits the extruder, thereby preventing the formation of a shaped food product.

Thus, the above prior art processes may result in both production and product difficulties, such as undesired skin formation, undesired finished product texture, and difficulties during extrusion.

Accordingly, it is among the objects of the present invention to provide an improved process for producing shaped food products which will insure both a smooth production run and a control of the desired characteristics of the finished product.

DISCLOSURE OF THE INVENTION

It has been found in accordance with the present invention that prepared food products having any desired size or shape may be formed from a slurry of comminuted food particles and additives including a binder and a time reaction system comprising a gelling agent such as an alginate and a bivalent ion releasing material. The slurry employed in the process according to the invention has the required rheological properties for shaping and shape retention making possible a continuous production process based on either extrusion, molding or the like. The consistency of the slurry is such that the shaped product is easily released from the shaping or forming device.

The method of the present invention may be applied to a wide variety of foodstuffs including vegetables, fruits, proteinaceous substances such as meats and fish products, shrimp products and the like and is not dependent upon the acidity of the foods or upon temperature. According to the present invention, the slurry may be formed from one or more of the comminuted foodstuffs referred to above, a binder comprising, for example, a cellulose ether alone or together with a gum such as guar gum, an alginate, a bivalent ion releasing material such as calcium carbonate, which reacts with the alginate to form a gel, an extender such as flour and/or starch, and optionally a pH control agent such as citric acid or any other weak physiologically acceptable acid, a suitable sequestering agent, such as a metaphosphate, and other additives, such as salt, sweeteners and colorants.

The binder used in the slurry maintains a certain degree of rigidity and shape of the product, and the gradual gelling of the alginate results in a certain setting of the product.

The pH control agent in combination with the sequestering agent results in a predetermined rate of release of the calcium ions, which results in the controlled gelling of the alginate. In certain cases the pH of the comminuted food product is such that either the acid or the acid and sequestering agent need not be added. For example, in the case of comminuted food products which release acid such as onions the pH control agent and sequestering agent need not be added to the slurry.

In each case the slurry must be adjusted in such a manner that the gelling takes place at a predetermined time interval. In general, the slurry is left standing for a predetermined period of time of from about 5 to about 30 minutes before the actual shaping and further processing is commenced. This allows sufficient time for the gelling to take place. The ratio of, and quantity of the various ingredients in the slurry determines the consistency and characteristics of the final product.

The actual shaping is carried out with an extruder, cutter or molding device. As mentioned above, the easy and fast release of the shaped food product from the extruder, cutter or molding device is important for an efficient continuous production process. Such release may be facilitated by a continuous rinsing of the extrusion head, cutter or mold with a liquid sud, water or with an aqueous solution of bivalent ions such as calcium ions which prevents the shaped product from sticking to the shaping device. When a solution such as calcium chloride solution is used for the rinsing, there results a smooth slippery surface which has a very low friction coefficient and which will be easily released from the shaping device. This rinsing solution is used in a small quantity and concentration, and is intended only to facilitate the easy release of the product, and does not result in the formation of a shape-retaining or self-supporting film or skin.

The shaped product may be further processed by contacting it with either a floury material or a normal batter and breading. If added adhesion of the batter coating to the product is desired, a small quantity of gelling agent can be added to the batter which will interact with alginate in the upper layer of the product.

The shaped food products may also be coated, cooked, fried, frozen and packed. When such frozen products are heated, they retain their shape, texture, eating qualities.

The components used for the process of the instant invention are reasonable in price, and thus the product can be produced on an economical basis.

DETAILED DESCRIPTION OF THE INVENTION

As indicated hereinabove, the shaped foods of this invention are produced by first forming a slurry of a comminuted food product and other additives, thereafter shaping the slurry by means of extrusion, molding or the like, followed by final processing which may include batter application, breading, cooking, such as frying, freezing and packaging. According to the present invention, the slurry contains one or more comminuted food products, a binder, a gelling agent, a compound releasing bivalent ions for reacting with the gelling agent, extenders, and optionally a pH control agent, a sequestering agent and additives such as salt, spices, sweetening agents, and coloring materials.

Suitable binders for use in the present invention include edible cellulose ethers which are non-toxic and water soluble. Examples of suitable cellulose ethers are alkyl, hydroxyalkyl and carboxyalkyl ethers, wherein the alkyl group contains 1-3 carbon atoms. Specific examples of the cellulose ethers are sodium carboxymethyl cellulose, methyl cellulose, ethyl cellulose, hydroxy methyl cellulose, hydroxy ethyl cellulose, hydroxypropyl cellulose, hydroxypropyl methyl cellulose and combinations thereof. These cellulose ethers may be employed in combination with gums such as a guar gum, gum tragacanth, gum karaya, xanthan gum, carageenan gum, furcellaran gum, locust bean gum, gum arabic or combinations thereof. While any suitable binder may be employed, it is presently preferred to employ hydroxypropyl methyl cellulose together with guar gum as the binder. A particularly preferred hydroxymethyl propyl cellulose is 100,000 CPS viscosity grade hydroxypropyl methocel K100M manufactured by Dow Chemical.

In general, the binder is employed in an amount of from about 0.10% to about 6.0% by weight based on the weight of the comminuted food product. When the binder is composed of both a cellulose ether and a gum, the cellulose ether is present, for example, in an amount of from about 20% to about 30% by weight of the binder, and the gum is present, for example, in an amount of from about 70% to about 80% by weight of the binder.

While any suitable gelling agent may be employed, it is presently preferred to employ an alginate such as sodium alginate or potassium alginate. A particularly preferred alginate is a sodium alginate having the trade name Protanal SF-120 distributed by Multi-Kem Corp. and produced by Protan and Fagertun of Norway. The alginate is generally present in the slurry in an amount of from about 0.1% to about 1.0% by weight based on the weight of the comminuted food product.

Compounds which release bivalent ions for reacting with the alginate to produce a gel include calcium carbonate, calcium phosphate and the like. Calcium carbonate is, however, presently preferred. The calcium ion releasing compounds react with the alginate to produce a calcium alginate gel. The ion releasing compound is generally present in an amount of from about 0.001% to about 0.004% by weight based on the weight of the comminuted food product.

Suitable pH control agents include weak organic acids such as citric acid, maleic acid and tartaric acid. The pH control agent may be omitted from the slurry when the comminuted food product that is being used releases a weak acid. Onions are an example of such a food product. When the pH control agent is employed, it is generally present in an amount of from about 0.001% to about 0.05% by weight based on the weight of comminuted food product.

While any suitable sequestering agent may be employed together with the pH control agent, according to the present invention it is presently preferred to use a metaphosphate such as sodium hexametaphosphate. The sequestering agent is usually employed only when a pH control agent is employed. In general, when the sequestering agent is employed, it is present in an amount of from about 0.001% to about 0.05% by weight based on the weight of the comminuted food product.

Suitable extenders which may be employed in the slurry according to the present invention include starch and flour which are usually used together. In general, the starch is present in an amount of from about 3% to about 12% by weight based on the weight of the comminuted food product. It is, however, presently preferred to use starch in an amount of from about 5.5% to about 6.5% by weight. The flour is generally present in an amount of from about 3% to about 12% by weight based on the weight of comminuted food product. A preferred amount is of from about 7.5 to about 8.5 by weight.

The slurry may also contain one or more optional additives such as salt, spices, sweetening agents, and coloring materials. In general, when such materials are present in the slurry they are present in an amount of from about 0.01% to about 1.0% by weight based on the weight of the comminuted food particles.

As stated above, the food products which are suitable for use in the present invention include vegetables, fruits, proteinaceous substances, such as meat and fish products, shrimp products and the like. The process according to the present invention is particularly suitable for use with comminuted or shredded food products such as fresh onions, rehydrated onions, cauliflower, mushrooms, peppers, apples, poultry meats, meat, fish, shrimps and calamari. A preferred product is onion rings, which requires a very well defined consistency in order to be an acceptable and saleable product. The food products are shredded, diced or comminuted by conventional means known in the art.

The slurry is prepared by mixing together all of the materials which make up the slurry excepting the comminuted or shredded food product. When the dry blend of these materials is mixed together, they are then added and mixed with the comminuted or shredded food product for 2 to 5 minutes at room temperature so as to form a slurry. The resultant slurry which has a very high viscosity is allowed to stand for a period of from about 5 to about 30 minutes so as to allow the release of ions such as calcium ions from calcium carbonate which forms a calcium alginate gel. The slurry is then fed into a shaping apparatus such as an extruder or molding device. While any such suitable device may be employed, it is presently preferred to pump the slurry through an extruder with cutting heads. When making onion rings, one can employ an Autoprod/Food extruder manufactured by Autoprod, Inc. with cutting heads which generate a ring-shaped product of approximately 10 to 12 grams. The same extruder can be used with different cutting heads to extrude other shapes such as balls, crescent, rods, etc.

Desirably a bivalent ion containing rinse solution is used to wash the extruder cutters or molding plate to facilitate the easy release of the shaped product from the cutters or molding plate. It is presently preferred to employ an aqueous calcium chloride solution (0.2% to 5.0%).

The extruder shaped products then fall individually on a mesh conveyor belt that carries the products to a batter unit wherein batter is applied. If more adhesion of the batter to the product is desired, a small quantity of a suitable alginate, e.g., sodium alginate, can be added to the batter which will then interact with the calcium ions on the surface of the product. This process step is normally followed by a breading unit wherein the products are breaded. The breaded product is then usually cooked, and in the case of onion rings, deep fried for a short period of time for example about 30 seconds at 400° F., and then individually quick frozen and packaged.

The final shaped product before batter and breading is applied according to the present invention comprises, for example, a cellulose ether in an amount of from about 0.10% to about 2.5% by weight, a gum in an amount of from about 0% to about 2.5% by weight, alginate salt in an amount of from about 0.05% to about 0.80% by weight, an extender in an amount of from about 6.0% to about 15.0% by weight and a foodstuff in an amount of from about 80% to about 90% by weight. A preferred example is 0.2% cellulose either, 0.9% guar gum, 0.36% alginate salt, 12.0% extender, and 86.0% foodstuff (onion).

As stated above, ingredients in the dry blend prior to the addition of the comminuted or shredded food product comprise the following materials, the weight percent (based on the weight of materials in the slurry before the addition of the foodstuff) indicated for each material representing the broad range which could be used and preferred amounts.

| Materials | Preferred | Range |
|---|---|---|
| Corn Starch | 37% | 30–60% |
| Wheat Flour | 49 | 30–60 |
| Hydroxypropyl methyl cellulose | 1.5 | 1–15 |
| Guar Gum | 6.0 | 0–15 |
| Sodium Alginate | 2.5 | 0.5–5 |
| Calcium Carbonate | .012 | .006–.02 |
| Sugar (optional) | 4.4 | 0.–10 |
| Salt (optional) | 0.9 | 0–5 |
| Citric Acid (as required) | 0 | 0–.02 |
| Sodium Hexametaphosphate (as required) | 0 | 0–.02 |

The ratio of the diced fresh and/or rehydrated onion to the dry blend mix system is preferably 6.0 to 1, but can range from about 5:1 to about 10:1.

Specific examples of some preferred formulations are illustrated in the following examples. These examples are by way of illustration only and are not to be construed in a limitative manner.

EXAMPLE 1

Production of Onion Rings

A dry blend of the following was prepared (parts by weight);
16 Parts corn starch
25 Parts wheat flour
0.8 Parts sodium alginate (KELTONE, Kelco Co.).
0.003 Parts calcium carbonate
3.2 Parts hydroxypropyl methyl cellulose, 100,000 CPS viscosity grade (hydroxypropyl methocel K-1000M, Dow Chemical).

This mix was added to 250 parts of ¼″-diced, fresh onions in a ribbon mixer and mixed for three minutes at room temperature so as to form a slurry.

The resultant slurry had a very high paste-like viscosity. The mixture was allowed to stand for 5–15 minutes so as to allow the release of calcium ions from the calcium carbonate due to the acid pH created by the onion exudate and for the consequent reaction of the calcium ions with the algin molecules to form a calcium alginate gel.

The slurry was then pumped by a creamery pump through an Autoprod Food type extruder with cutting heads generating a ring-shaped product of approximately 10–12 grams. The cutters were washed with an aqueous solution of calcium chloride of five parts to one hundred parts of water by weight. This wash solution facilitated the release of the formed ring-shaped product from the cutters.

The extruded onion rings fell individually on a mesh conveyor belt that carries the product to a batter unit which is followed by a breading unit. The breaded product was deep fried at 400° F. for 30 seconds, and then individually quick frozen and packaged.

The finished product, when heat reconstituted for serving, had the desired juiciness and mouth feel.

EXAMPLE 2

Production of Onion-Rings

Extruded onion rings were prepared according to Example 1, with the substitution of water-rehydrated dried onion pieces which, when reconstituted with water, were approximately ¼″ in size.

The interior texture of the finished cooked product resembled that of Example 1.

EXAMPLE 3

Production of Onion Rings

Dry blend of the following was prepared (parts by weight):
15.2 parts corn starch 20.0 parts wheat flour
1.0 parts sodium alginate
0.004 parts calcium carbonate
0.6 parts hydroxypropyl methyl cellulose
2.5 parts guar gum
0.4 parts salt
1.8 parts sugar This mix was added to 250 parts of ¼" diced fresh onions. The procedure for preparing the onion rings was as set forth in Example 1.

EXAMPLE 4

Production of Apple Rings

Dry blend of the following is prepared (parts by weight):

25 parts corn starch
16 parts white flour
0.6 parts sodium alginate
0.003 parts calcium carbonate
2.3 parts of hydroxypropyl methyl cellulose
1.1 parts of guar gum
5 parts of sugar
1 part of salt This mix is added to 250 parts of ¼" diced fresh apples. The remainder of the process is as in Example 1.

Having thus discussed the present invention, what is desired to be secured by Letters Patent and hereby claimed is:

1. A process for the production of shaped food products from comminuted, granulated or chopped foodstuffs comprising (1) preparing a slurry of one or more foodstuffs with a binder, a gelling agent and a bivalent ion releasing material; said slurry being prepared by first mixing together the binder, the gelling agent and the bivalent ion releasing material to form a dry blend, the dry blend of these materials is then added and mixed with the foodstuffs to form the slurry, the resultant slurry is then allowed to stand for a period of time sufficient to allow the release of ions from the bivalent ion releasing material so as to form a gel; said binder being selected from the group consisting of a cellulose ether, a gum and mixtures thereof and being present in an amount of from about 0.10% to about 6.0% by weight based on the weight of the foodstuff; said gelling agent being an alkali metal alginate and being present in an amount of from about 0.1% to about 1.0% based on the weight of the foodstuffs; said bivalent ion releasing material being present in an amount of from about 0.001% to about 0.004%; (2) preparing a shaped food product by shaping the slurry by means of a shaping and forming device; and (3) processing the shaped food product into a final product.

2. A process according to claim 1, wherein the binder is a cellulose ether.

3. A process according to claim 2, wherein the cellulose ether is selected from the group consisting of carboxy methyl cellulose, carboxy ethyl cellulose, carboxypropyl cellulose, methyl cellulose, ethyl cellulose, hydroxy methyl cellulose, hydroxy ethyl cellulose, hydroxypropyl cellulose, hydroxypropyl methyl cellulose and mixtures thereof.

4. A process according to claim 3, wherein the cellulose ether is hydrxoypropyl methyl cellulose.

5. A process according to claim 1, wherein the binder is a cellulose ether and a gum.

6. A process according to claim 5, wherein the cellulose ether is selected from the group consisting of carboxy methyl cellulose, carboxy ethyl cellulose, carboxypropyl cellulose, methyl cellulose, ethyl cellulose, hydroxy methyl cellulose, hydroxy ethyl cellulose, hydroxypropyl cellulose, hydroxypropyl methyl cellulose and mixtures thereof and the gum is selected from the group consisting of guar gum, gum tragacanth, gum karaya, xanthan gum, carageenan, furcellaran gum, locust bean gum, gum arabic and mixtures thereof.

7. A process according to claim 1, wherein the binder is hydroxypropyl methyl cellulose and guar gum.

8. A process according to claim 1, wherein the bivalent ion releasing material is a calcium ion containing compound.

9. A process according to claim 8, wherein the alkali metal alginate is sodium alginate and the calcium containing compound is calcium carbonate.

10. A process according to claim 1, wherein the slurry additionally contains a pH control agent.

11. A process according to claim 10, wherein the pH control agent is a weak organic acid selected from the group consisting of citric acid, tartaric acid and maleic acid.

12. A process according to any of claims 1, 10 or 11, wherein the slurry additionally contains a sequestring agent.

13. A process according to claim 12, wherein the sequestring agent is a metaphosphate.

14. A process according to claim 13, wherein the metaphosphate is sodium hexametaphosphate.

15. A process according to claim 1, wherein the shaped food product is rinsed with an aqueous calcium containing compound solution while being released from the shaping and forming device.

16. A process according to claim 15, wherein the calcium compound solution is an aqueous calcium chloride solution.

17. A process according to claim 1, wherein the slurry additionally contains an extender.

18. A process according to claim 17, wherein the extender is selected from the group consisting of starch, flour and mixtures thereof.

19. A process according to claim 8, wherein the components are used in such proportions so that the slurry is left to stand for a period of time of from about 5 to about 30 minutes, allowing for the interaction of the alginate with the calcium ion releasing compound, thereby increasing the viscosity of the slurry prior to the shaping step.

20. A process according to claim 1, wherein the processing step (3) is carried out by contacting the shaped food product with either a floury material or normal batter and thereafter breading it.

21. A shaped food product, which food product is in the form of a gel and comprises a cellulose ether selected from the group consisting of hydroxy alkyl and carboxy alkyl elluloses the alkyl groups of which contain from 1 to 3 carbon atoms, said cellulose ether being present in an amount of from about 0.1 to about 2.5% by weight; alginate salt in an amount of from about 0.05 to about 0.80% by weight; a comminuted, granulated or chopped foodstuffs selected from the group consisting of vegetables, fruits, meat, and mixtures thereof, in an amount of from about 80 to 90% by weight and an extender in an amount of from about 6 to 15% by weight.

22. A shaped food product in the form of a gel and comprising a cellulose ether selected from the group consisting of hydroxy alkyl and carboxy alkyl celluloses the alkyl groups of which contain from 1 to 3 carbon atoms, said cellulose ether being present in an amount of from about 0.1 to about 2.5% by weight of said shaped product; a gum in an amount of from about 0.1 to 2.5% by weight; alginate salt in an amount of from about 0.05 to about 0.80% by weight; a comminuted, granulated, or chopped foodstuffs selected from the group consisting of vegetables, fruits, meat, and mixtures thereof, in an amount of from about 80 to 90% by weight and an extender in an amount of from about 6 to about 15% by weight.

23. The process according to claim 1, wherein onions are employed as said foodstuff.

24. The process according to claim 1, wherein apples are employed as said foodstuff.

25. The product according to claim 21, wherein the foodstuff are onions and the product is in the shape of a ring.

26. The product according to claim 21, wherein the foodstuffs are apples and the product is in the shape of a ring.

* * * * *